United States Patent Office 3,513,888
Patented May 26, 1970

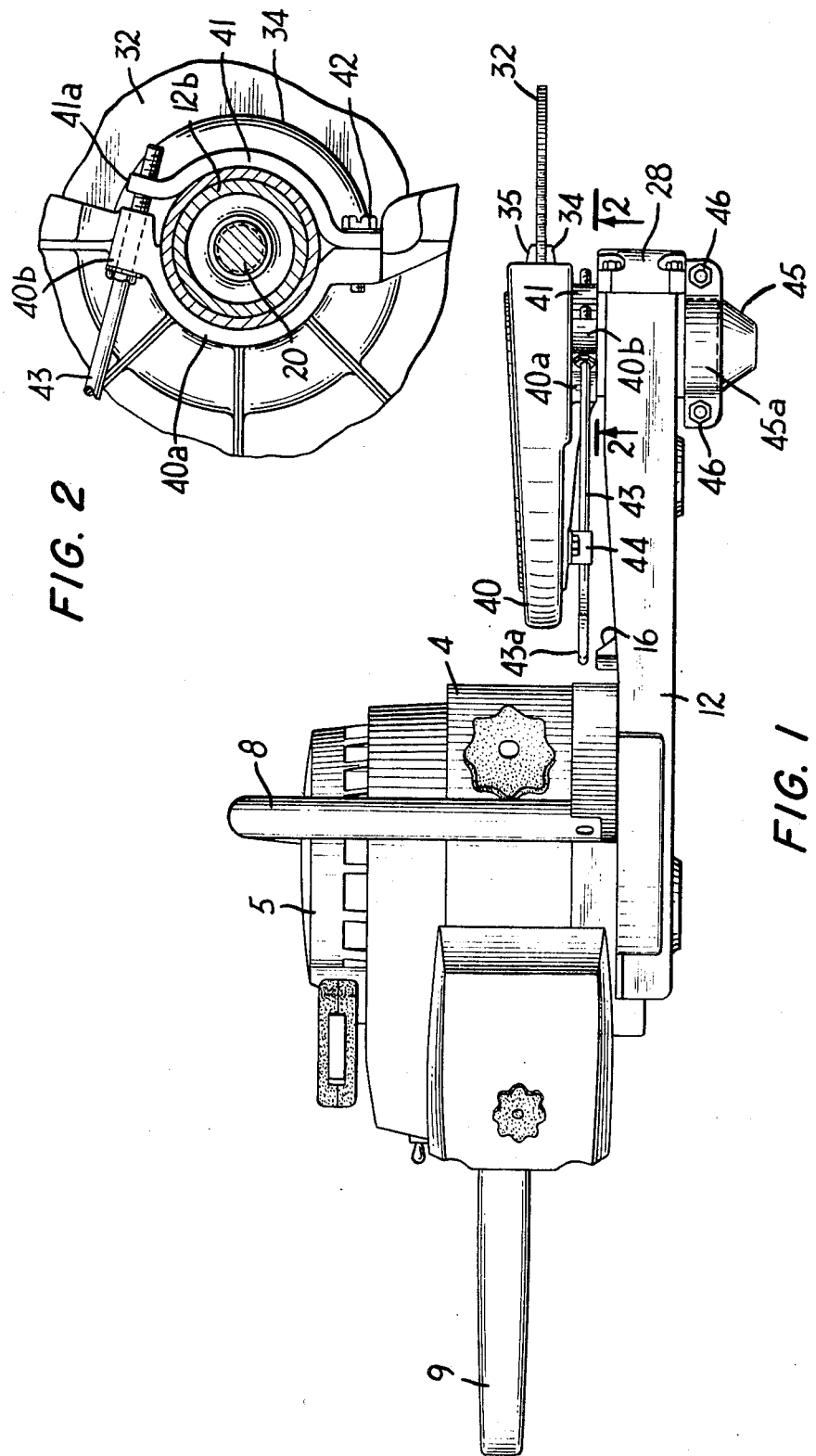

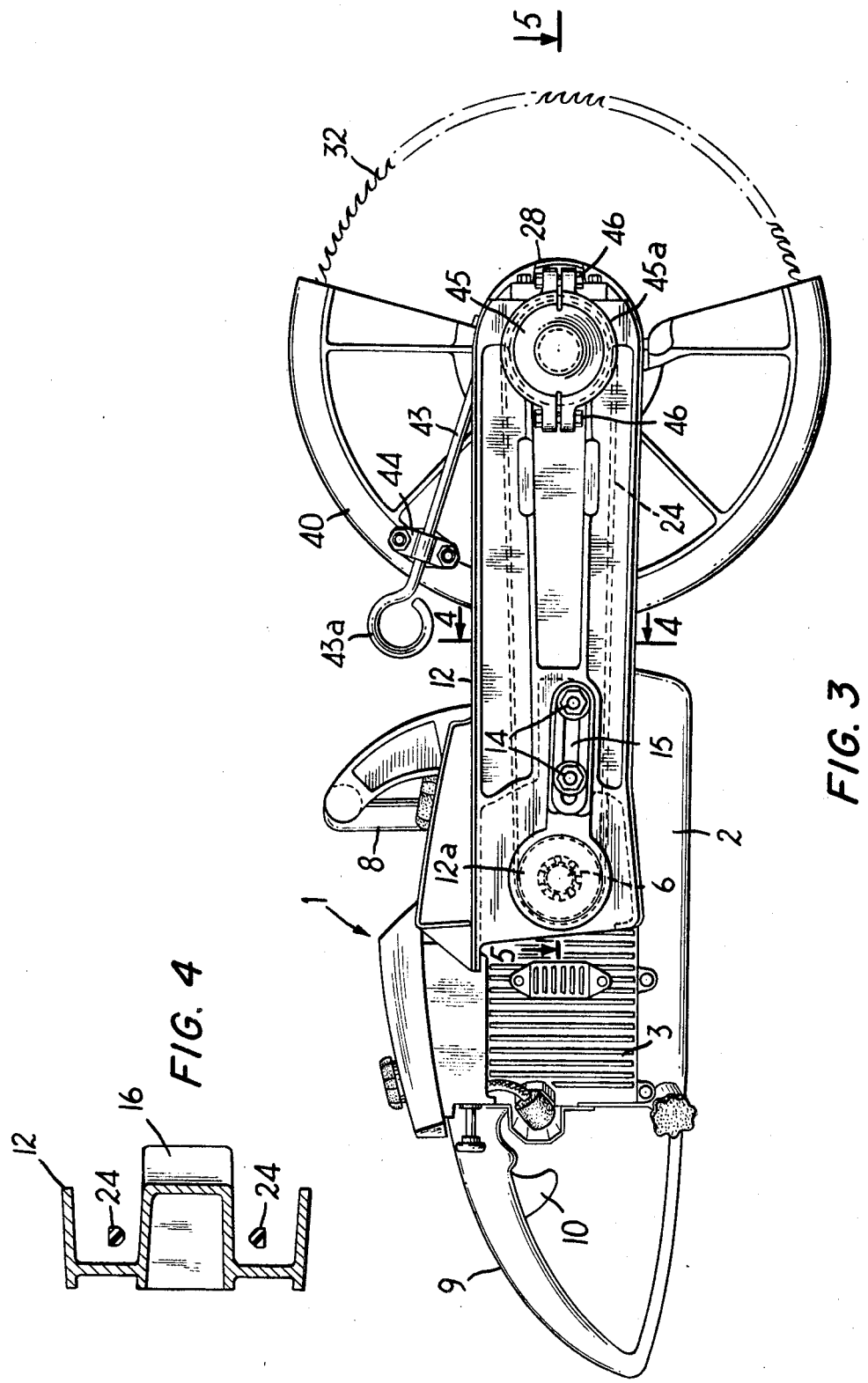

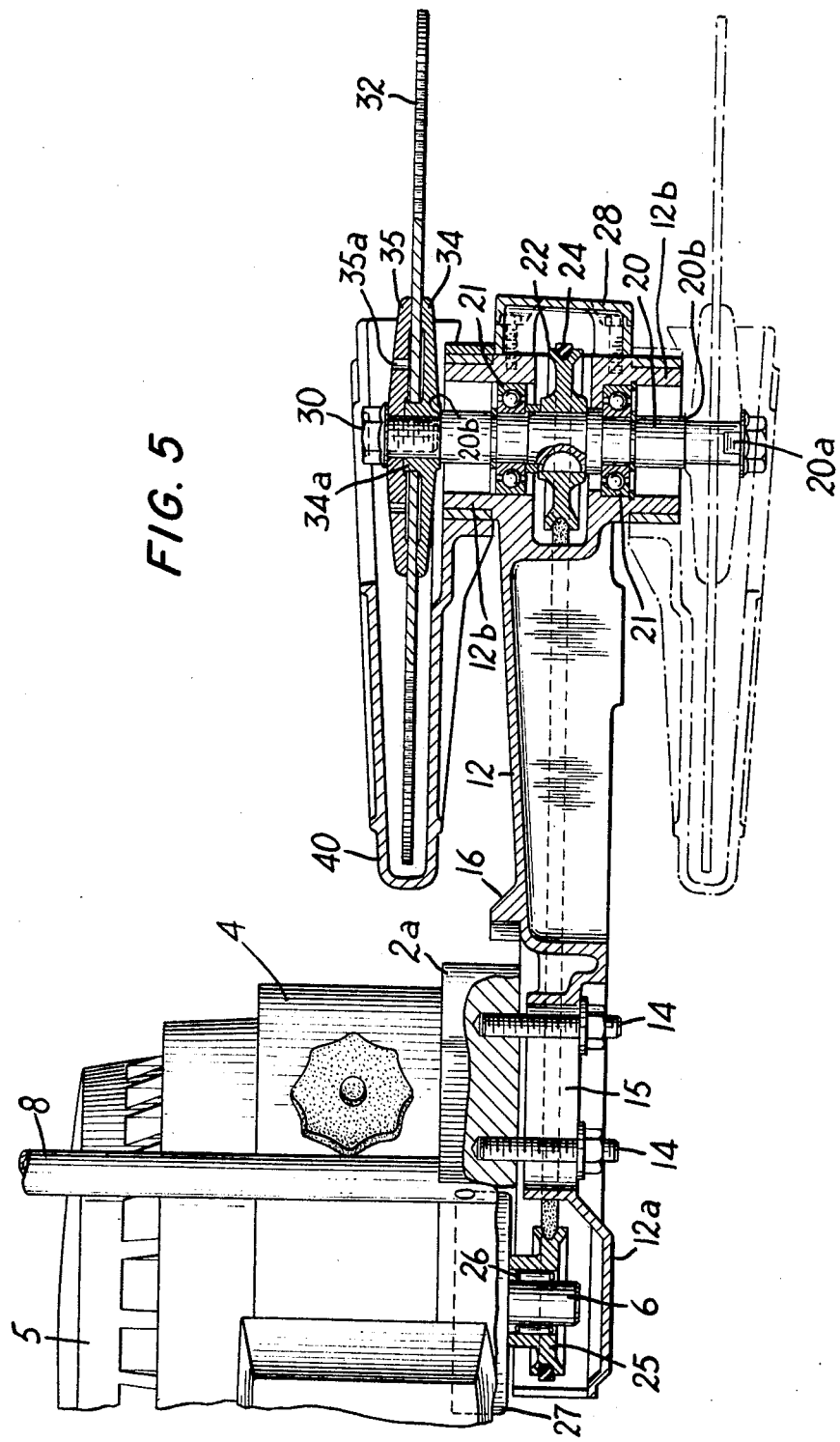

3,513,888
PORTABLE POWER DRIVEN CIRCULAR SAW
David M. Townsend, Byram, Conn., and William H. Welsh, White Plains, N.Y., assignors to Textron Inc., Providence, R.I. a corporation of Delaware
Filed July 10, 1967, Ser. No. 652,299
Int. Cl. B27b 9/00
U.S. Cl. 143—43                     8 Claims

ABSTRACT OF THE DISCLOSURE

A portable power driven circular saw comprises a motor assembly including a motor having chassis, a drive shaft projecting at one side of the chassis and handles having portions located approximately in a vertical plane passing through the center of gravity of the motor assembly. The handles include a top handle and a rear handle. An arm extending forwardly from the same side of the chassis rotatably supports a saw blade shaft having inboard and outboard ends extending respectively to opposite sides of the arm. The saw blade shaft is parallel to the drive shaft and is suitably driven from the drive shaft, e.g., by a belt and pulleys. A cutting disc which may be an abrasive wheel or a toothed blade is selectively mounted on either end of the saw blade shaft. When mounted on the inboard end of the shaft, the cutting disc is approximately in a vertical plane passing through the center of gravity of the motor assembly. When mounted on the outboard end of the shaft, the cutting disc is on the outboard side of the supporting arm and in position for cutting close to an obstruction.

---

The present invention relates to a portable power driven circular saw which is useful for many purposes particularly in construction and demolition work.

The saw in accordance with the invention is a portable power driven circular saw having an engine assembly and a saw blade in the form of a circular cutting disc carried on an arm projecting forwardly from the engine assembly and driven from the engine. The cutting disc may, for example, be an abrasive cutting wheel or a toothed saw blade. For convenience the cutting disc, whatever its form, is herein referred to as the saw blade.

In order to provide proper balance for convenient and safe use of the saw, it is desirable to locate the circular saw blade approximately in a plane passing through the center of gravity of the saw. However, particularly for demolition work, it is sometimes necessary to cut as close as possible to an existing obstruction, e.g., a beam or a column. When the saw blade is mounted centrally approximately in line with the center of gravity of the engine assembly a cut close to an obstruction cannot be made.

In accordance with the present invention, the saw blade can be mounted selectively in either of two positions. In one position, it is located approximately in a plane passing through the center of gravity of the saw so as to provide proper balance for normal use. In the other position, the saw blade is mounted outboard at one side of the saw in such position as to cut very close to an existing obstruction. A cover for one end of the saw shaft and a guard for the saw blade are mounted interchangeably on opposite sides of the supporting arm so that the guard provides protection from injury by the saw blade and the cover encloses the end of the shaft on which the saw blade is not mounted.

The nature and advantages of the invention will be more fully understood from the following description of a preferred embodiment shown by way of example in the drawings in which:

FIG. 1 is a plan view of the saw,

FIG. 2 is a partial section taken approximately on the line 2—2 in FIG. 1,

FIG. 3 is a side view looking from the right hand side, and

FIG. 4 is a partial cross section taken approximately on the line 4—4 in FIG. 3 and FIG. 5 is a view partially in horizontal section taken approximately on the line 5—5 in FIG. 3.

As illustrated by way of example in the drawings, the saw comprises a motor assembly, an arm projecting forwardly from one side of the motor assembly, a saw blade shaft rotatably carried by the arm and driven from the motor and a circular saw blade which is selectively mounted on either end of the saw blade shaft.

The motor shown as a 2-cycle internal combustion engine 1 having a frame or chassis 2, a cylinder 3, fuel tank 4 and fan housing 5. A drive shaft 6 projects from one side of the engine. Suitable handles are provided on the engine chassis for supporting the engine assembly and thereby supporting the entire saw. The handles are shown as comprising a tubular handle 8 which extends transversely over the top of the engine and with sufficient space between the handle and the engine to accommodate the operator's hand. At the rear end of the engine there is provided a handle 9 having a shape resembling a pistol grip. A trigger-shaped throttle control member 10 is associated with the handle 9 in position so that it can be manipulated by the forefinger of the operator's hand which grasps the handle 9 so that the operator can control the speed of the engine while gripping the handle. The handle 9 and a portion of the handle 8 are located approximately in a plane which passes through the center of gravity of the saw so that when the saw is held by the handles 8 and 9, it is essentially balanced and can hence be supported and manipulated with minimum effort and maximum convenience and safety. An arm 12 projects forwardly from the same side of the engine on which the drive shaft 6 projects. The arm is removably secured to the engine by bolts 14 which pass through an elongated opening 15 in the arm and screw into tapped holes in a bracket portion 2a of the chassis. The opening 15 is sufficiently long in relation to the spacing of the bolts 14 to permit adjustment of the arm 12 in a lengthwise direction relative to the chassis to adjust the tension of the belt by which the saw blade is driven. Adjustment of the arm is readily effected by means of a wedge-shaped tool (not shown) inserted between the adjacent portion 2a of the engine and an inclined abutment 16 provided on the arm 12.

The arm 12 is generally of channel section and has a portion 12a overlying the drive shaft 6. At the front end of the arm 12, a saw blade shaft 20 is rotatably supported by ball bearings 21. The saw blade shaft 20 extends transversely of the arm 12 and is parallel to the engine drive shaft 6. A pulley 22 keyed on the saw blade shaft between the spaced bearings 21 is driven by a V-belt 24 from a driving pulley 25 on the engine drive shaft 6. The driving pulley 25 is shown rotatably mounted on the drive shaft 6 by a roller bearing 26 and is coupled to the drive shaft by a centrifugal clutch 27. At low speeds, the engine drive shaft 6 turns freely in the pulley 25. When engine speed is increased to a predetermined value, the centrifugal clutch 27 automatically engages to couple the pulley 25 to the drive shaft 6 and thereby drive the saw blade shaft 20 by means of the V-belt 24. The belt and pulleys are substantially enclosed in part by the channel shaped arm 12 and in part by a removable cap 28 at the outer end of the arm. The portion of the arm 12 between the pulleys is formed to provide two channels which open inwardly and in which the belt runs so as to provide protection against accidental contact with the operator.

The saw blade shaft 20 projects on opposite sides of the arm 12 and is essentially symmetrical with respect to the pulley 22. Each end of the shaft is provided with diametrically opposite flattened portions 20a and with a tapped axial bore to receive a threaded bolt 30. Spaced inwardly from each end of the shaft, there is provided an annular shoulder 20b.

A circular saw blade 32 is selectively mounted on either end of the saw blade shaft 20. The saw blade is secured between an inner washer 34 which seats on the shoulder 20b of the shaft and an outer washer 35 which is secured on the shaft by the bolt 30. The inner washer 34 has a hub portion 34a which is snugly received in a central hole of the saw blade. The outer washer is non-rotatably coupled to the shaft 20 by having a central hole which is circular except for flattened portions which mate with the flattened portions 20a provided at the opposite ends of the shaft 20. The outer washer 35 is provided with holes 35a to receive a tool for holding the washer and thereby holding the shaft 20 against rotation when the bolt 30 is being tightened or loosened.

It will be seen from the foregoing description that the circular saw blade 32 can readily be mounted on either end of the shaft 20 and can be changed from one end to the other merely by loosening the bolt 30, moving the saw blade and washers to the opposite end of the shaft and screwing the bolt 30 into that end. When the saw blade is on the inboard end of the shaft 20 as illustrated in sold lines in FIG. 5, it lies approximately in a vertical plane passing through the center of gravity of the engine 1 and the saw as a whole. This provides optimum balance and stability for normal use of the saw. However, with the saw in this position, it is not possible to cut close to a wall or other obstruction. Hence when it is desired to cut closer to an obstruction than is possible with the saw blade located centrally of the unit, the saw blade is transferred to the outboard end of the shaft 20 as indicated in broken lines in FIG. 5. With the blade in the later position, it is possible to cut very close to a wall, column or other vertical obstruction. Moreover, by turning the saw 90 degrees about its longitudinal axis, it is possible in like manner to cut very close to a ceiling or floor.

As illustrated in the drawings, means is provided for affording protection for the operator or other persons working nearby from contact with the saw blade or with the projecting opposite end of the shaft 20. Moreover means is provided for interchangeably mounting a guard for the saw blade and a cover for the shaft end on opposite sides of the supporting arm 12 so that they can be changed from one side to the other when the saw blade is moved from one end of the shaft 20 to the other. For this purpose, the arm 12 is provided at opposite sides with annular projecting portions 12b which are concentric with and radially spaced from the blade shaft 20. The blade guard and shaft end cover are selectively clamped on the annular projecting portions 12.

The blade cover 40 is parti-circular and is shown as enclosing somewhat more than 180 degrees of the saw blade. At one side, the blade guard 40 is provided with an approximately semicircular collar 40a adapted to fit onto the annular projections 12b of the supporting arm 12. An arcuate member 41 is secured at one end to the blade cover by a bolt 42 while the other end is provided with a radially projecting portion 41a which is tapped to receive the threaded end of an elongated bolt 43 which extends through and is rotatably supported by a bearing portion 40b on the blade guard. The elongated bolt 43 extends beyond the perimeter of the blade guard 40 and is further rotatably supported near the perimeter by a bracket 44. The projecting outer end of the elongated bolt 43 is provided with a handle portion shown in the form of an eye 43a for convenient rotation of the bolt. When the bolt is rotated in a direction to screw it into the radially projecting portion 41a of the clamp 41, the projecting annular portion 12b of the supporting arm 12 is tightly gripped between the collar 40a of the blade guard and the clamp 41 to secure the guard on the arm. It will be seen that when the clamp is slightly loosened, the guard can be rotated about the shaft 20 to any desired angular position and secured in that position by again tightening the clamp. Moreover, the guard can readily be removed from the arm 12 merely by loosening the clamp and slipping the guard off of the annular projecting portion 12b. When the blade cover 40 is in the position shown in FIGS. 1 and 2, it substantially covers the open sides of the channels of the arm 12 in which the belt 24 runs and thereby provides further protection for the belt.

The cover 45 for the end of the shaft 20 on which the saw blade is not mounted is shown as an approximately frusto-conical cap having a collar portion 45a which fits on the annular projection 12b of the supporting arm 12 and is split at opposite sides to provide contraction and expansion. The collar 45a is contractible by means of diametrically opposite bolts 46 which can be tightened to secure the cover 45 on the annular projection 12b of the supporting arm 12. With the cap 45 in place over the end of the shaft on which the saw blade is not mounted, the operator is projected from the end of the rotating shaft and the shaft bearings are protected against the entry of dirt.

While a preferred embodiment of the invention has been illustrated in the drawings and is herein particularly described, it will be understood that the invention is in no way limited to this embodiment and the modification of construction may be made within the scope of the annexed claims.

What we claim is:

1. A portable power-driven circular saw comprising a motor assembly including a motor having a chassis, a drive shaft projecting at one side of said chassis and handles having portions located approximately in a vertical plane passing through the center of gravity of said motor assembly, said handles including a top handle and a rear handle, an arm extending forwardly from said one side of said chassis, a saw shaft rotatable mounted on said arm and having inboard and outboard ends extending respectively to opposite sides of said arm, said saw shaft being parallel to said drive shaft, driving connection means between said drive shaft and said saw shaft, means on opposite ends of said saw shaft for mounting a circular saw blade selectively on the inboard end of said saw shaft approximately in said vertical plane passing through the center of gravity of said motor assembly and on the outboard end of said saw shaft and outboard side of said arm in a position in which the saw blade is outboard of said motor assembly so that the plane of the saw blade does not intersect said motor assembly, a removable cover for one end of said saw shaft and a guard for said saw blade, and means for interchangeably securing said cover and guard on opposite sides of said arm adjacent said saw shaft, said guard and said cover being reversible so as to fit on either side of said arm and said guard being secured on the side on which said saw blade is mounted and said cover being secured on the opposite side.

2. A portable power-driven circular saw according to claim 1, in which said driving connection means comprises a pulley on each of said shafts and a belt running on said pulleys.

3. A portable power-driven circular saw according to claim 1, in which said arm is provided on opposite sides with like annular projections concentric with said saw shaft, and in which said securing means comprises means for clamping said guard and cover respectively on said annular projections.

4. A portable power-driven circular saw according to claim 3, in which said clamping means on said guard comprises a split collar received on the respective one of said annular projections and an elongated bolt for tightening said collar on said annular projection, said bolt extending beyond the perimeter of said guard.

5. A portable power-drive circular saw according to claim 1, in which said arm is of double-channel cross sectional shape and in which said belt runs in and is substantially enclosed in the channels of said arm.

6. A portable power-driven circular saw according to claim 1, in which said motor is an internal combustion engine.

7. A portable power-driven circular saw comprising an engine assembly including an engine having a chassis, a drive shaft projecting at one side of said chassis and front and rear handles having portions located approximately in a vertical plane passing through the center of gravity of said motor assembly; a pulley on said drive shaft, an arm extending forwardly from said one side of the chassis, a saw shaft parallel to said drive shaft, spaced bearings rotatably mounting said saw shaft at the forward end of said arm, a pulley fixed on said saw shaft between said bearings and in line with said pulley on the drive shaft, a drive belt running on said pulleys, said shaft having like inboard and outboard ends extending respectively to opposite sides of said arm, means on opposite ends of said saw shaft for mounting a circular saw blade selectively on the inboard end of said saw shaft and on the outboard end of said shaft, first and second annular projections concentric with said shaft on opposite sides of said arm, a guard for said saw blade and means for rotatably mounting said guard selectively on said annular projections and for clamping said guard in selected angular position on said annular projection which it is mounted.

8. A portable power-driven circular saw according to claim 7, further comprising a dished cover for enclosing the end of said saw shaft on which said saw blade is not mounted, said cover having a collar portion fitting on the respective said annular projection and means for releasably securing said cover on said annular projection.

References Cited

UNITED STATES PATENTS

| | | | |
|---|---|---|---|
| 2,158,444 | 5/1939 | Wardle | 143—43 |
| 2,610,657 | 9/1952 | Kiekhaefer | 143—32 |
| 2,810,409 | 10/1957 | Ibelle et al. | |
| 2,798,516 | 7/1957 | Heal et al. | 143—32.12 |

FOREIGN PATENTS

| | | |
|---|---|---|
| 1,334,753 | 7/1963 | France. |

ANDREW R. JUHASZ, Primary Examiner

J. F. COAN, Assistant Examiner

U.S. Cl. X.R.

143—32